US009446793B2

(12) United States Patent
Choi et al.

(10) Patent No.: US 9,446,793 B2
(45) Date of Patent: Sep. 20, 2016

(54) UNDER-FLOOR FRAME SYSTEM FOR VEHICLE

(71) Applicant: Hyundai Motor Company, Seoul (KR)

(72) Inventors: Chi Hoon Choi, Gyeonggi-Do (KR);
Young Ho Choi, Gyeonggi-Do (KR);
Gi Hwan Kim, Gyeonggi-Do (KR);
Jeong Min Cho, Gyeonggi-Do (KR);
Hermann Hansen, Russelsheim (DE);
Rolf Verhoeven, Russelsheim (DE);
Pawel Kwasniak, Russelsheim (DE)

(73) Assignee: Hyundai Motor Company, Seoul (KR)

( * ) Notice: Subject to any disclaimer, the term of this patent is extended or adjusted under 35 U.S.C. 154(b) by 30 days.

(21) Appl. No.: 14/520,124

(22) Filed: Oct. 21, 2014

(65) Prior Publication Data

US 2015/0251700 A1    Sep. 10, 2015

(30) Foreign Application Priority Data

Mar. 4, 2014  (KR) .................. 10-2014-0025757

(51) Int. Cl.
*B62D 21/02*    (2006.01)
*B60R 19/03*    (2006.01)
*B62D 29/04*    (2006.01)
*B62D 25/20*    (2006.01)

(52) U.S. Cl.
CPC ............. *B62D 21/02* (2013.01); *B60R 19/03* (2013.01); *B62D 25/20* (2013.01); *B62D 29/041* (2013.01)

(58) Field of Classification Search
CPC .... B62D 21/02; B62D 29/041; B62D 25/20; B60R 19/03
See application file for complete search history.

(56) References Cited

U.S. PATENT DOCUMENTS

| 6,270,153 | B1* | 8/2001 | Toyao ................ B62D 21/06 296/204 |
| 6,296,301 | B1 | 10/2001 | Schroeder et al. |
| 7,125,067 | B2 | 10/2006 | Bonnett et al. |
| 7,469,957 | B1* | 12/2008 | Boettcher ............ B62D 21/02 296/193.07 |
| 7,503,576 | B1 | 3/2009 | Schroeder |
| 2015/0251700 | A1* | 9/2015 | Choi ................... B62D 25/20 296/204 |

FOREIGN PATENT DOCUMENTS

| JP | 60-229181 B2 | 10/1985 |
| JP | H10507983 A | 4/1998 |
| JP | 2010-149511 A | 7/2010 |
| JP | 2012-171533 A | 9/2012 |
| KR | 10-1998-0024836 B1 | 6/1998 |

* cited by examiner

*Primary Examiner* — Glenn Dayoan
*Assistant Examiner* — Melissa A Black
(74) *Attorney, Agent, or Firm* — Mintz Levin Cohn Ferris Glovsky and Popeo, P.C.; Peter F. Corless

(57) ABSTRACT

An under-floor frame system is disclosed. In particular, a main frame made of carbon fiber composite materials forms a closed quadrangle. A center cross member made of carbon fiber composite materials runs along a width direction of a vehicle and connects middles of the both side members. Also, a front cross member and a rear cross member made of carbon fiber composite materials runs along a width direction of a vehicle and connects a front side member portion and a rear side member portion at both sides of the main frame, respectively. A center tunnel member made of carbon fiber composite materials and is extended in a width direction of a vehicle to traverse an upper space of the center cross member and connects the front cross member and the rear cross member.

10 Claims, 5 Drawing Sheets

UNDER-FLOOR FRAME SYSTEM FOR VEHICLE

CROSS REFERENCE TO RELATED APPLICATION

The present application claims priority to Korean Patent Application No. 10-2014-0025757, filed on Mar. 4, 2014, the entire contents of which is incorporated herein for all purposes by this reference.

BACKGROUND (a) Technical Field

The present invention relates to an under-floor frame system for a vehicle capable of increasing the rigidity and reducing weight by using a carbon fiber composite material.

(b) Background Art

Generally, separately manufactured underfloor components of a vehicle, such as, a floor side/cross member, a center/rear floor and a side seal/side member, are welded separately in order to produce a conventional Steel body in white (BIW) under-floor frame. Additionally, a connection cross member is formed with an open-sectional surface.

In the above configurations, a connection portion of the center/rear floor is cut. Thus the number of the members that make up a connection structure increases as a result. Also an open portion member is partially formed with an open-sectional surface thus then forming closed-sectional surface which is then cut. As a result, the floor member is connected inconsistently, thereby causing inconsistent rigidity and often weakening durability.

Further, numerous members are required to connect a side seal/side member/cross member. Also, excessive deformation may occur due to the open-sectional surface of the cross member during side impact collisions.

The description provided above as a related art of the present invention is just for helping in understanding the background of the present invention and should not be construed as being included in the related art known by those skilled in the art.

SUMMARY OF THE DISCLOSURE

According to an aspect of the present invention, there is provided an under-floor frame system that may include a main frame which is formed of carbon fiber composite materials and is formed of a closed quadrangle. In particular, a front of the main frame may be a front bumper member, both sides of the main frame may be side members running from a front to a rear of the main frame, and a rear of the main frame is a rear bumper member. Additionally, a center cross member may be formed from carbon fiber composite materials, run along a width direction of a vehicle, and connect the middle of the both side members. A front cross member and a rear cross member may also be formed of carbon fiber composite materials, run along a width direction of a vehicle, and connect to a front side member portion and a rear side member portion at both sides of the main frame, respectively. Furthermore, a center tunnel member also may be formed of carbon fiber composite materials and be extended in the length direction of a vehicle to traverse an upper space of the center cross member and connect the front cross member and the rear cross member.

As such, in some exemplary embodiments of the present invention, a center cross member may be provided as a pair made up of a front center cross member and a rear center cross member which are spaced apart in parallel at a predetermined distance from each other.

In addition, in some exemplary embodiments of the present invention, an end of the center tunnel member may be divided into two strands at a side of the front cross member or the rear cross member, and the respective divided ends may be in close contact with the front cross member or the rear cross member that are extended in the same direction thereof.

The divided end of the center tunnel member may then be connected to the side member of the main frame, and the side member, divided ends of the center tunnel member and the ends of the corresponding front cross member or the rear cross member may be connected to each other, leaving a triangular space therebetween. As such, the divided point of the center tunnel member may form a triangular space together with the corresponding front cross member or the rear cross member.

The under-floor frame system may further include an additional side member which may be formed of carbon fiber composite materials, may be extended in the length direction of a vehicle, and may be connected to the side member of the main frame. Also, a door seal member may be formed of carbon fiber composite materials and may be connected to an outer end of the additional side member. Divided ends of a front end of the center tunnel member may be connected to the front cross member, the side member, the additional side member, and the door seal member. Divided ends of a rear end of the center tunnel member may be connected to the rear cross member and the additional side member. The front end of the additional side member may also be extended to connect to the front cross member via the side member.

The under-floor frame system may further include a support member which may be formed of carbon fiber composite materials, be divided in an upward direction from the center tunnel member, and be extended. Additionally, an end of the support member is connected to a cowl cross member.

The end of the center tunnel member may be divided into two strands along a side portion of the rear cross member. As such, the respective divided ends may be in close contact with the rear cross member in order to be extended in the same direction thereof to be connected to the side member of the main frame. Additionally, the side member, the divided ends of the center tunnel member and the end of the rear cross member may be connected to each other, leaving a triangular space therebetween.

Further, the center tunnel member may be provided with two strands that are extended in parallel and in close contact. These, two strands may be divided along a side of the front cross member or along a side of the rear cross member, may be in close contact with the front cross member or the rear cross member and may be extended in the same direction thereof.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
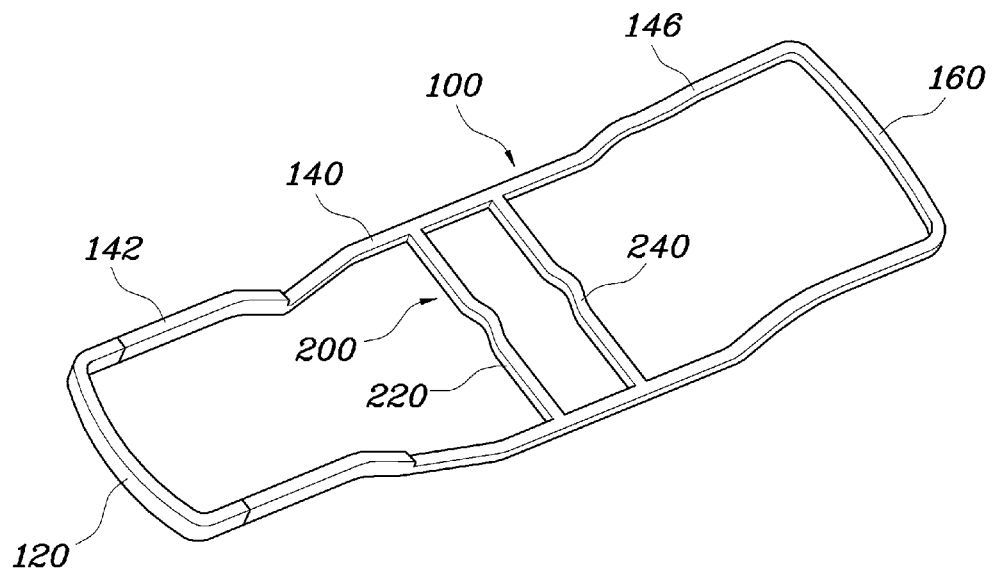
FIG. 1 is a perspective view illustrating a main frame of an under-floor frame system for a vehicle according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an under-floor frame system for a vehicle is described with reference to the accompanying drawings according to a preferred embodiment of the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Figure 2:
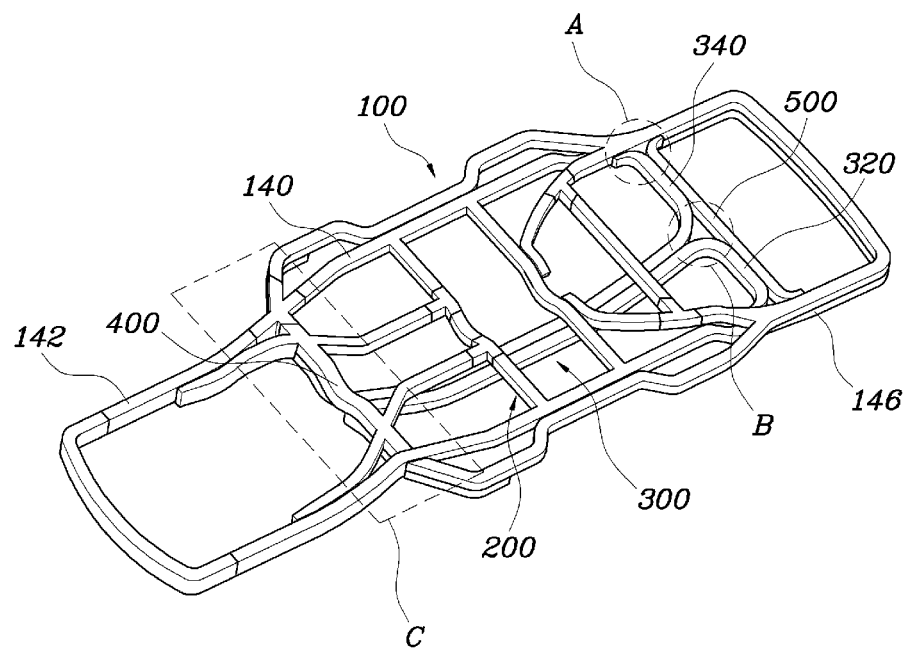
FIG. 2 is a perspective view illustrating a main frame of an under-floor frame system for a vehicle, which is shown from a bottom thereof, according to an exemplary embodiment of the present invention.
Figure 3:
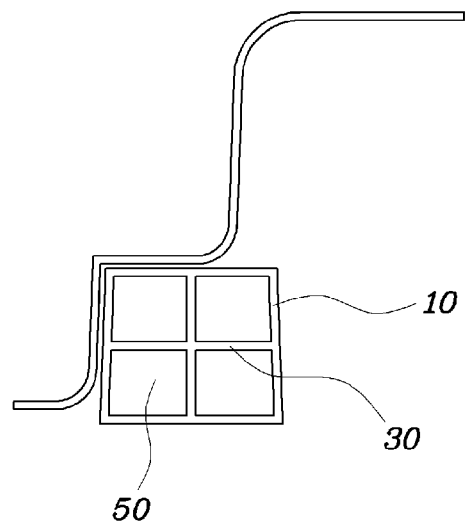
FIG. 3 is a cross-sectional view illustrating a member of an under-floor frame system for a vehicle according to an exemplary embodiment of the present invention.
Figure 4:
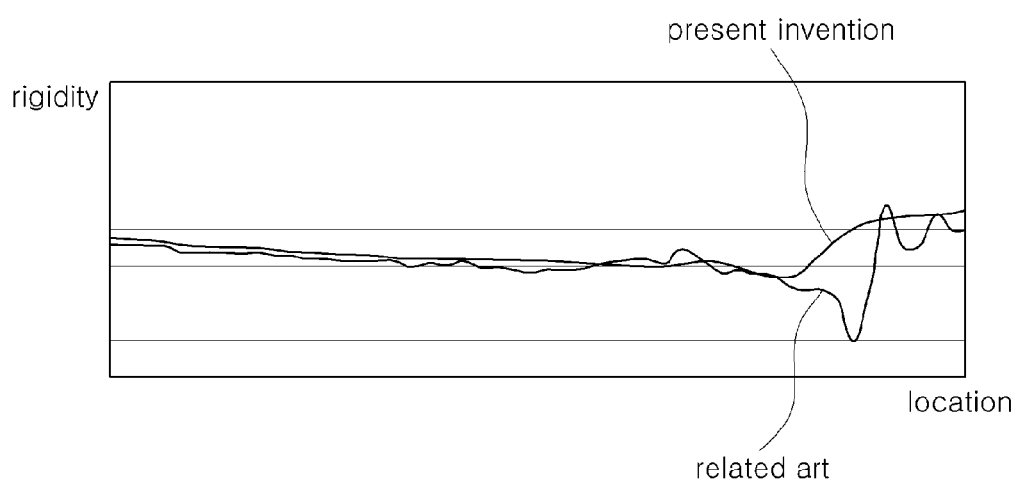
FIG. 4 is a graph illustrating the effects of an under-floor frame system for a vehicle according to an exemplary embodiment of the present invention.

FIG. 1 is a perspective view illustrating a main frame of an under-floor frame system for a vehicle according to an exemplary embodiment of the present invention, FIG. 2 is a perspective view illustrating a main frame of an under-floor frame system for a vehicle, which is shown from a bottom thereof, according to an exemplary embodiment of the present invention, FIG. 3 is a cross-sectional view illustrating a member of an under-floor frame system for a vehicle according to an exemplary embodiment of the present invention, and FIG. 4 is a graph illustrating the effects of an under-floor frame system for a vehicle according to an embodiment of the present invention.

An under-floor frame system for a vehicle according to an exemplary embodiment of the present invention, which is formed of carbon fiber composite materials, may include: a main frame 100 where four members are connected integrally to form a closed quadrangle, a front of which is a front bumper member 120, both sides of which are side members 140 running from a front to a rear of the main frame and a rear of which is a rear bumper member 160; and a center cross member 200 which is formed integrally with the main frame 100 and runs along a width direction of a vehicle and connects a middle of the both side members 140.

According to the present invention, as shown in FIG. 1, the one-piece main frame 100 and the center cross member 200 are a continuously rigid under-floor frame system for a vehicle. In particular, the under-floor frame system for a vehicle of the present invention has members formed integrally with carbon fiber composite material as main elements. This main frame 100 serves as an under-floor frame system for a vehicle in which the members are integrally connected to form a closed quadrangle.

In the exemplary embodiment of the present invention, the under-floor frame system is formed of carbon fiber composite materials and thus the freedom degree for forming various shapes is great and the edges of a vehicle frame that make up a floor of the vehicle are formed as a quadrangle, and as a result, the rigidity is greatly increased in comparison to a conventional under-floor frame system.

Here, the front of a quadrangular main frame 100 is the front bumper member 120, both sides thereof are side members 140 running from a front to rear of the main frame, respectively, and a rear thereof is the rear bumper member 160. Further, a center cross member 200 is formed integrally with the main frame 100 and runs along a width direction of a vehicle and connects the middle of the both side members 140.

FIG. 2 is a perspective view illustrating a main frame of an under-floor frame system for a vehicle, which is shown from a bottom thereof, and according to an exemplary embodiment of the present invention the center cross member 200 is made up of a pair of components made up of a front center cross member 220 and a rear center cross member 240. These may be spaced a predetermined distance apart from each other.

Meanwhile, a front cross member 400 and a rear cross member 500 may also be include. These members 400 and 500 are also made of carbon fiber composite materials that run along a width direction of a vehicle and connect a front side member portion 142 and a rear side member portion 146 at both sides of the main frame 100, respectively.

Further, a center tunnel member 300 is added, which is formed of carbon fiber composite materials to be extended in a width direction of a vehicle and connects the front cross member 400 and the rear cross member 500.

In summary, the end of the center tunnel member 300 may be divided into two strands along a side of the front cross member 400 or the rear cross member 500, and the respective divided ends 320, 340 may be in close contact with the front cross member 400 or the rear cross member 500 to be extended in the same direction thereof. Additionally, the divided ends of the center tunnel member 300 may be connected to the side member 140 of the main frame 100. The side member 140, the divided ends 320, 340 of the center tunnel member 300, and the end of the corresponding front cross member 400 or the rear cross member 500 may be connected to each other, leaving a triangular space "A" therebetween. The respective member becomes a side of a triangle, leaving a triangular space therebetween, so that the rigidity of a connection portion is increased.

Further, the division point of the center tunnel member 300 may form a triangular space "B" together with the corresponding front cross member 400 or the rear cross member 500 thereby to increase the rigidity.

In more detail, the end of the center tunnel member 300 may be divided into two portions along a side of the rear cross member 500. These respective divided ends 320, 340 may be in close contact with the rear cross member 500 and extended in the same direction. Additionally the divided ends 320, 340 may be connected to the side member 140 of the main frame 100. As such, the side member 140, a divided end of the center tunnel member 300, and the end of the rear cross member 500 may be connected to each other, leaving a triangular space "A" therebetween.

In particular, as shown in the drawings, the center tunnel member 300 may include two strands that extend in parallel and are in close contact. In particular, each strand is divided along a side of the front cross member 400 or along a side of the rear cross member 500 in the same direction. Under this configuration, the center cross member 200 is not divided but is continuous in order to increase the rigidity.

Meanwhile, as shown in FIG. 2, the center tunnel member 300 may be extended to run through an upper space of the center cross member 200. Further, the respective members may be formed of carbon fiber composite materials, and may be constructed of a skin 10 consisting a quadrangular edge, an inner partition 30 dividing an inner space defined by the skin 10 into a matrix, and a filler 50 made of the carbon fiber composite materials that is filled into the partitioned space, as shown in FIG. 3.

FIG. 4 is a graph illustrating the results of evaluating the rigidity at the part C of FIG. 2. In particular, it is shown that the variation in rigidity according to the present invention has increased continuity across the closed sectional structure and is particularly effective at member connections in comparison to a conventional frames made of steel.

Figure 5:
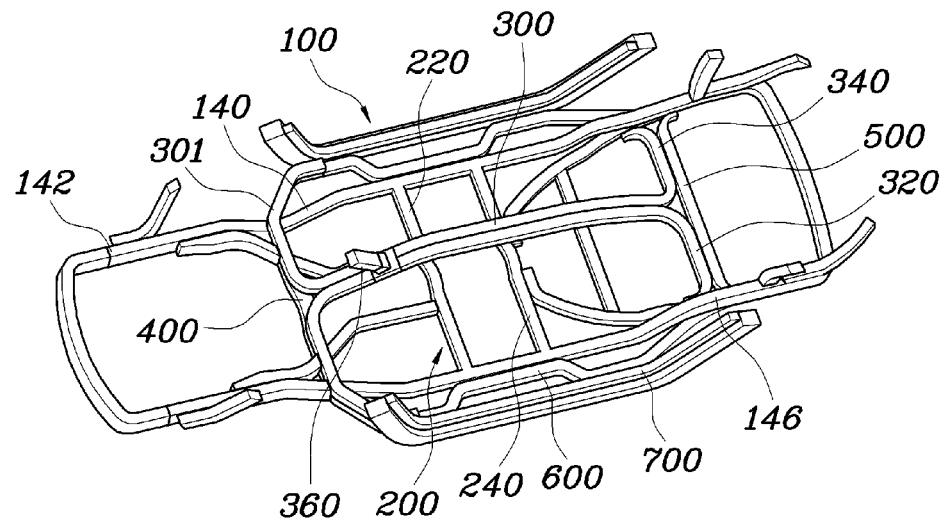
FIG. 5 is a perspective view illustrating an under-floor frame system for a vehicle, which is shown from a top thereof, according to an exemplary embodiment of the present invention.
Figure 6:
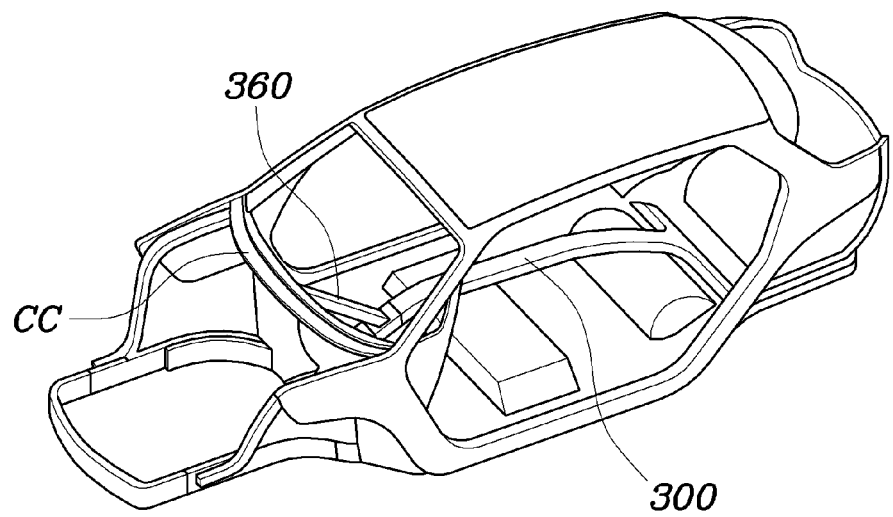
FIG. 6 is a perspective view illustrating an under-floor frame system adapted in a vehicle according to an exemplary embodiment of the present invention.

Further, as shown in FIG. 5, an additional side member 600 and a door seal member 700 may be provided at the outer side of a vehicle, which are made of carbon composite materials. In more detail, the additional side member 600 is extended in the length direction of a vehicle and is connected to the side member 140 of the main frame 100. Additionally, the door seal member 700 may be formed of carbon composite materials and connected to an outer end of the additional side member 600.

Here, the divided end 301 of a front end of the center tunnel member 300 may be connected to the front cross member 400, the side member 140, the additional side member 600, and the door seal member 700. Further, the divided end of a rear end of the center tunnel member 300 may be connected to the rear cross member 500 and the additional side member 600. Through this configuration an overall torsional stiffness of a vehicle can be greatly increased.

Meanwhile, a front end of the additional side member 600 may be extended to be connected to the front cross member 400 via the side member 140. The additional side member 600 may also be formed of carbon fiber composite materials and may be divided in an upward direction (relative to the ground) and is extended along a center tunnel member 300. The additional side member 600 may further include a support member 360, an end of which is connected to a cowl cross member CC.

Advantageously, the overall torsional stiffness of a vehicle is increased through the support member 360. That is, the center tunnel member 300 and the cowl cross member CC are connected through the support member 360 by forming a peculiar shape that the center tunnel member 300 lays over the center cross member 200, thereby increasing additionally the rigidity.

The below table shows a comparison of stiffness between the cases where the center tunnel member 300 is provided and not provided.

TABLE 1

| Classification | A case where the center tunnel member is provided | A case where the center tunnel member is not provided | Comparison |
| --- | --- | --- | --- |
| Torsional static stiffness, GJ [$10^4$ kg$_f$m$^2$/rad] | 15.2 | 14.7 | 3.4% increased |
| BIW weight(kg) | 123 | 116 | 7 kg increased |
| Specific stiffness (GJ/BIW weight) | 12.3 | 12.6 | 2.4% increased |

Reviewing the above comparison results, it is confirmed that the torsional static stiffness is increased by 3.4% by dividing the center tunnel member 300 and then bonding or connecting it to other members using structural bonding agent as in the present invention, and the specific stiffness obtained by dividing the torsional static stiffness by BIW weight is increased by 2.4%.

The center tunnel member may be formed of carbon fiber composite materials and has an excellent surface property to an extent to be used as an interior material for a vehicle and a structural stiffness is equal to or more than that of steel. Further, a structural design thereof is possible, which is difficult to be applied to steel BIW, due to excellent formation properties.

Accordingly, a center console structure can be designed to increase the structural stiffness of a vehicle while maintaining an outer appearance quality as an interior material, using the center tunnel member. The member may be a center tunnel member. In particular, a center console is bonded to other members disposed at an under floor of a vehicle to increase a torsional rigidity and further is disposed higher on the under floor in comparison to a conventional center tunnel member thereby improving rigidity due to an increase in bending moment inertia. Accordingly, a rigidity of a vehicle body can be ensured and the weight of vehicle body can be lightened without adding components made of steel or increasing the thickness of the frame.

Figure 7:
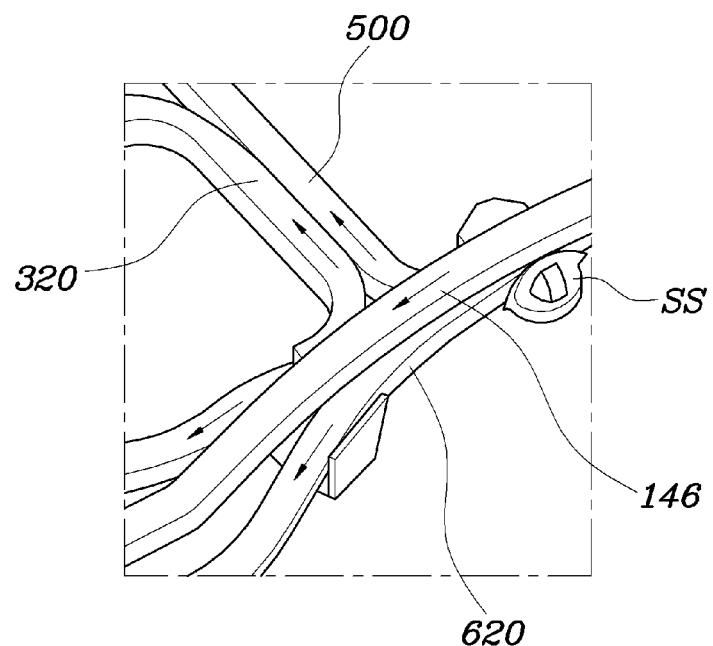
FIGS. 7 to 9 are views illustrating load transmission procedures based on a spring sheet in an under-floor frame system for a vehicle according to an exemplary embodiment of the present invention, respectively.
Figure 8:
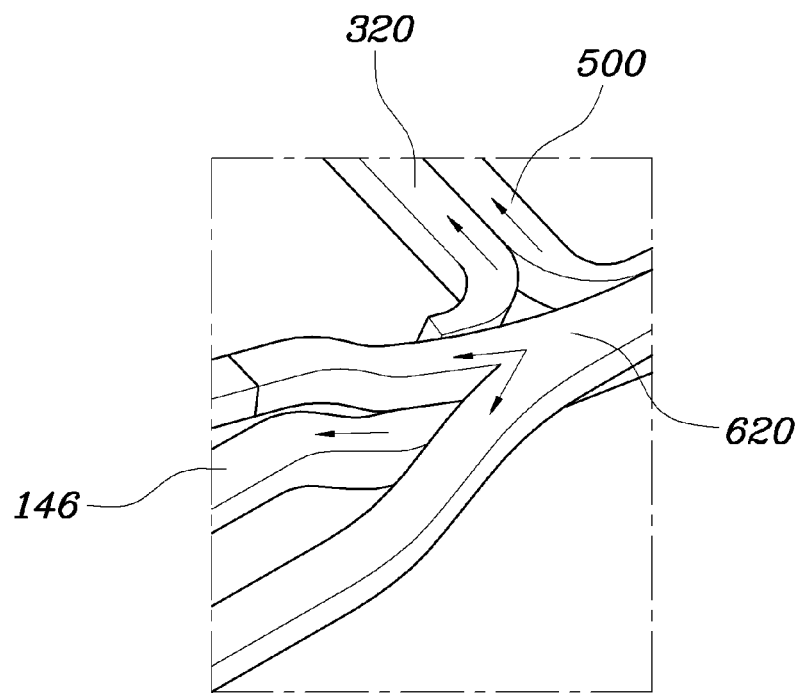
Figure 9:
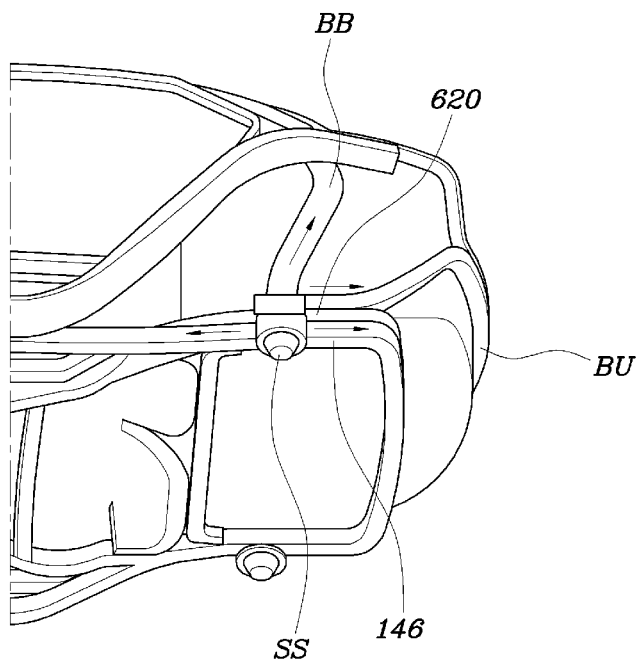

FIGS. 7 to 9 are views illustrating load transmission procedures based on a spring sheet in an under-floor frame system for a vehicle according to an exemplary embodiment of the present invention, respectively. In the under-floor frame system according to the present invention, as shown in the drawings, the rear end of the additional side member 600 is extended along the rear bumper member 146 of the main frame 100 to form an additional rear member 620 made of carbon fiber composite materials.

That is, the additional side member 600 is provided as a pair to correspond to the respective side member 140. In particular, a rear end of the respective additional side member 600 may be connected through the additional rear member 620 made of carbon fiber composite materials or the additional rear member 620 may be formed integrally with the additional side member 600 as in the exemplary embodiment shown in the drawing.

Further, the additional side member 600 may be connected to an outer end of the side member 140. As such, the additional rear member 620 may be in close contact along a lower end of the rear bumper member 146 in order to be connected thereto.

That is, the side member 140 and the rear bumper member 146 may be connected by being bent to have a height difference and the additional side member 600 may be connected to an outer end of the side member 140 with same height due to the height difference to ensure rigidity with respect to a side collision of a vehicle, and the additional rear member 620 may be connected to a lower end of the rear bumper member 146 to ensure rigidity with respect to a rear collision of a vehicle.

Additionally, a spring sheet SS on which a rear wheel suspension spring may be mounted may be connected to a lower end of the additional rear member 620. In more detail, the spring sheet SS may be connected to a lower end of the additional rear member 620 where the additional rear member 620 and the rear bumper member 146 may be connected.

Meanwhile, a lower end of a C pillar member BB formed of carbon fiber composite materials may be connected to an upper end of the rear bumper member 146 corresponding to the spring sheet SS and at the same time a bumper main member BU may be connected thereto.

The rear collision paths may be formed safely through this configuration as shown in FIG. 8. At least five load transmission paths may be formed to more prominently disperse the load compared to a conventional vehicle structure. Further, the loads are transmitted more efficiently through the path formed by surface contact, not through the path cut by welding, to the respective member.

According to the present invention, the floor members are integrally connected to be efficient with respect to rear collisions based on a free formation of carbon fiber composite materials to prevent rolling of a vehicle, and the impact transmitted to a spring sheet when a vehicle bumps to be dispersed efficiently in order to ensure the rigidity. Further, the load is dispersed when a vehicle collides at a rear side and the rigidity is increased efficiently due to a closed-sectional surface and integration of the members.

Further, the members at a rear side of a vehicle may be formed as a dual member bonding structure so that a spring sheet is enforced and the torsion rigidity and floor rigidity can be increased. Also, the corrosion problem due to additional enforcement material being applied thereto, which is required in related art, can be solved to improve durability.

According to the under-floor frame system as configured above, the rigidity can be increased and weight thereof can be reduced by using carbon fiber composite materials. Specifically, the under-floor frame system is integrally formed in order to ensure the continuous rigidity at connection points and thus discontinuity thereof can be prevented and further advantages in manufacturing it can be obtained. Finally, the load can be dispersed efficiently when a vehicle collides through free connection.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An under-floor frame system comprising:
    a main frame made of carbon fiber composite materials and forming a closed quadrangle, wherein a front of which is a front bumper member, both sides of which are side members running from a front to a rear of the main frame, and a rear of which is a rear bumper member;
    a center cross member made of carbon fiber composite materials, wherein the center cross member runs along a width direction of a vehicle and connecting a middle of the both side members;
    a front cross member and a rear cross member made of carbon fiber composite materials, wherein the front cross member and the rear cross member run along with a width direction of a vehicle and connect to a front side member portion and a rear side member portion at both sides of the main frame, respectively; and
    a center tunnel member made of carbon fiber composite materials and extended in the length direction of a vehicle to traverse an upper space of the center cross member and connect the front cross member and the rear cross member: and
    a support member made of carbon fiber composite materials, divided in an upward direction from the center tunnel member, and extended, wherein an end of which is connected to a cowl cross member.

2. The under-floor frame system of claim 1, wherein the center cross member is provided as a pair made up of a front center cross member and a rear center cross member which are spaced apart in parallel at a distance from each other.

3. The under-floor frame system of claim 1, wherein an end of the center tunnel member is divided into two strands at a side of the front cross member or the rear cross member, and the respective divided ends are in close contact with the front cross member or the rear cross member to be extended in the same direction thereof.

4. The under-floor frame system of claim 3, wherein the divided end of the center tunnel member is connected to the side member of the main frame, and the side member, the divided ends of the center tunnel member and the end of the corresponding front cross member or the rear cross member are connected to each other, leaving a triangular space therebetween.

5. The under-floor frame system of claim 3, wherein the divided point of the center tunnel member forms a triangular space together with the corresponding front cross member or the rear cross member.

6. The under-floor frame system of claim 3, further comprising:
    an additional side member made of carbon fiber composite materials, extended in the length direction of a vehicle, and connected to the side member of the main frame; and
    a door seal member made of carbon fiber composite materials and connected to an outer end of the additional side member, wherein the divided ends of a front end of the center tunnel member are connected to the front cross member, the side member, the additional side member, and the door seal member.

7. The under-floor frame system of claim 6, wherein divided ends of a rear end of the center tunnel member are connected to the rear cross member and the additional side member.

8. The under-floor frame system of claim 3, wherein a front end of the additional side member is extended and connected to the front cross member via the side member.

9. The under-floor frame system of claim 1, wherein the end of the center tunnel member is divided into two strands at a side of the rear cross member, the respective divided ends are in close contact with the rear cross member and extended in the same direction thereof to be connected to the side member of the main frame, wherein the side member, the divided ends of the center tunnel member and the end of the rear cross member are connected to each other, leaving a triangular space therebetween.

10. The under-floor frame system of claim 1, wherein the center tunnel member is provided with two strands that are extended in parallel and in close contact and the two strands are divided at a side of the front cross member or at a side of the rear cross member to be in close contact with the front cross member or the rear cross member and to be extended in the same direction thereof.

* * * * *